(12) United States Patent
Weil

(10) Patent No.: US 7,570,217 B2
(45) Date of Patent: Aug. 4, 2009

(54) DIVERSE ANTENNA METHOD AND SYSTEM EMPLOYING A CASE MOUNTED ANTENNA

(75) Inventor: Garry A. Weil, Portland, OR (US)

(73) Assignee: Intel Corporation, Santa Clara, CA (US)

(*) Notice: Subject to any disclaimer, the term of this patent is extended or adjusted under 35 U.S.C. 154(b) by 670 days.

(21) Appl. No.: 10/846,809

(22) Filed: May 14, 2004

(65) Prior Publication Data

US 2005/0254591 A1    Nov. 17, 2005

(51) Int. Cl.
*H01Q 1/24* (2006.01)
*H01Q 1/36* (2006.01)
(52) U.S. Cl. ............................. 343/702; 343/700 MS
(58) Field of Classification Search ............ 343/702, 343/700 MS, 904–906
See application file for complete search history.

(56) References Cited

U.S. PATENT DOCUMENTS

| | | | |
|---|---|---|---|
| 6,172,645 B1* | 1/2001 | Hollander et al. | 343/702 |
| 2003/0179815 A1* | 9/2003 | Kandiar | 375/219 |
| 2004/0150571 A1* | 8/2004 | Deng | 343/702 |
| 2004/0192075 A1* | 9/2004 | Lu | 439/49 |
| 2005/0064825 A1* | 3/2005 | Forrester | 455/101 |

* cited by examiner

*Primary Examiner*—Shih-Chao Chen
(74) *Attorney, Agent, or Firm*—Kacvinsky LLC

(57) ABSTRACT

A desktop computer case mounted antenna apparatus for providing a diverse antenna solution for wireless network communications and computing systems employing the same are disclosed. In one embodiment, the antenna is mounted, at least partially, within a peripheral drive bay of the case.

25 Claims, 4 Drawing Sheets

DIVERSE ANTENNA METHOD AND SYSTEM EMPLOYING A CASE MOUNTED ANTENNA

BACKGROUND

Wireless computing is becoming more commonplace as wireless technologies evolve to enable faster wireless communication over larger distances. A modern desktop computer user can take advantage of an add-in wireless network interface card (NIC), such as an IEEE 802.11 b/g compliant wireless local area network (LAN) NIC, or a desktop motherboard with IEEE 802.11 b/g LAN wireless capability to link their desktop computer to other computers using wireless communication links.

An issue that may be encountered by wireless desktop computer users is the need to ensure adequate RF (radio frequency) signal intensity in transmission and reception. One solution uses a PCI (Peripheral Component Interconnect) elbow antenna mounted on the rear portion of the computer's chassis or case. Typically this solution is in the form of PCI elbow antenna integral with a LAN NIC that itself is mounted in a PCI expansion slot or socket on the rear of the computer case. Often, however, a rear-mounted antenna provides insufficient or sporadic RF signal intensity. Hence it may be desirable for a user to adopt a diverse antenna solution to boost RF signal strength by, for example, adding a second antenna to their system. However, most desktop computer cases were not originally designed for the addition of an RF antenna other than one mounted on an expansion card. A second antenna could be rested on top of the desktop case but this adds another "tethered" object to the user's system and requires the user to find space for the antenna's signal cable.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
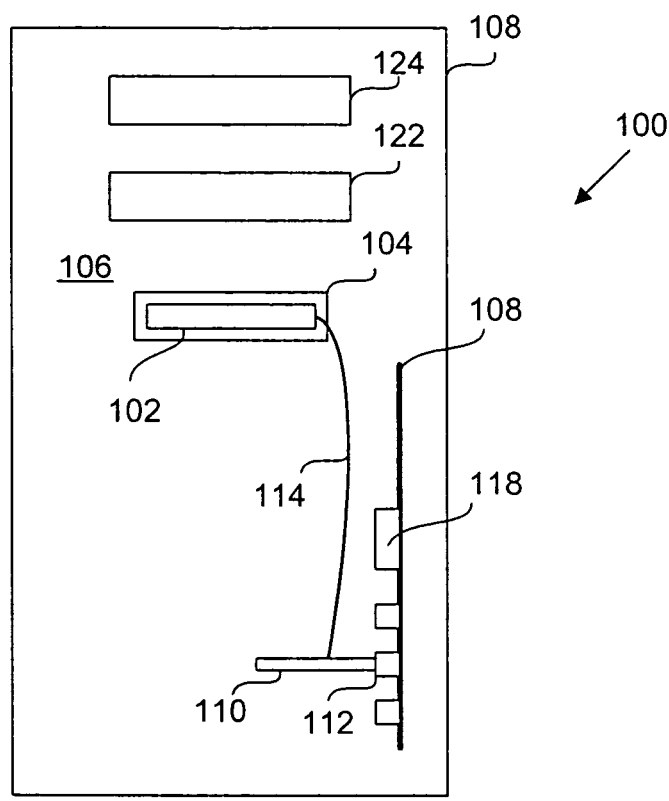
FIG. 1 illustrates an example system.
Figure 2:
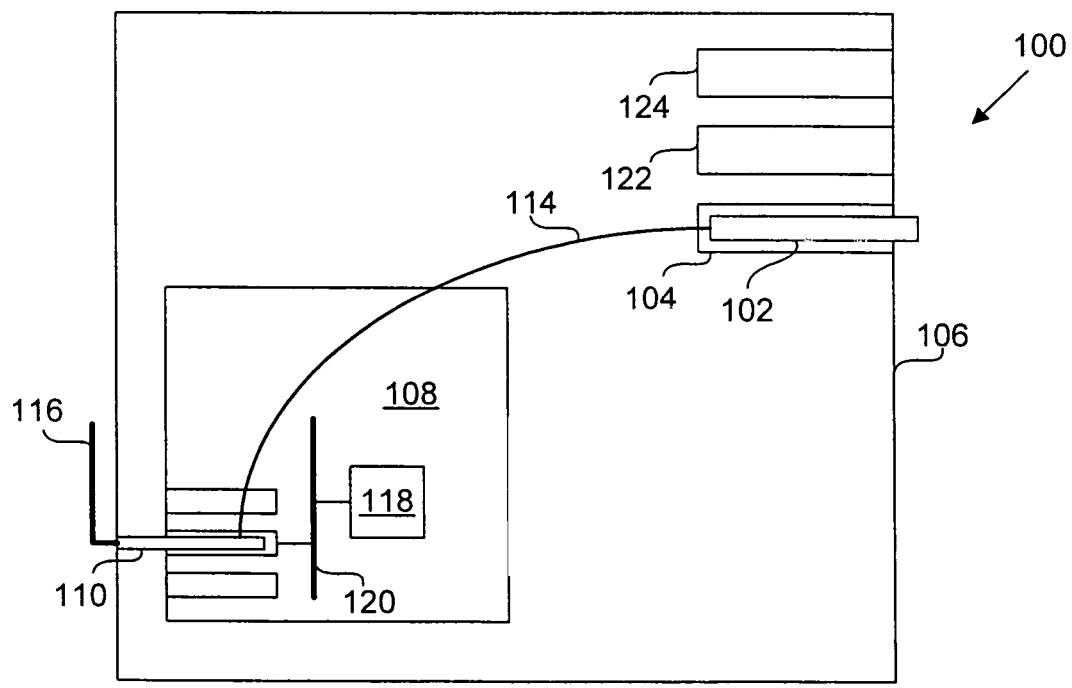
FIG. 2 is a side view of the system of FIG. 1.

FIG. 1 illustrates an example system 100. FIG. 2 is a side view of system 100. While system 100 illustrates an implementation of a general-purpose desktop computer system, the claimed invention is not limited in this regard. Although system 100 may be embodied in a single device, in some implementations certain components of system 100 may be remote or physically separated from other components of system 100. Further, although system 100 is illustrated as including discrete components, these components may be implemented in hardware, software/firmware, or some combination thereof. When implemented in hardware, some components of system 100 may be combined in a certain chip or device.

System 100 may include a first wireless antenna 102, a floppy disk drive bay 104, a computer chassis or case 106, a motherboard 108, a wireless network interface in the form of a peripheral component interconnect (PCI) local area network (LAN) wireless network interface card (NIC) 110, a PCI slot or socket 112, an antenna lead 114, a second wireless antenna 116, a processor 118, a PCI bus 120, a compact disk (CD) drive bay 122, and a digital versatile disk (DVD) drive bay 124. Antenna 102 may receive wireless information broadcast from a source remote to system 100 and may communicate that information to NIC 110 through lead 114. NIC 110 may then supply that information to processor 118 over PCI bus 120. Similarly, antenna 116 may receive wireless information broadcast from a source remote to system 100 and may communicate that information to NIC 110. NIC 110 may then supply that information to processor 118 over PCI bus 120.

Although system 100 may include wireless communication circuitry in card 110 suitable for linking to a LAN, in some implementations, NIC 110 may include circuitry suitable for connecting to a wide area network (WAN), or for connecting to a point-to-point wireless communications system, although the claimed invention is not limited in this regard. In some implementations, NIC 110 may include interface circuitry (not shown) to receive the information from antenna 102 and/or antenna 116.

Although system 100 may include a PCI compatible NIC 110, those of skill in the art will recognize that another type of wireless communications card, such as, for example, a WAN NIC, mounted in a non-PCI socket may be used without departing from the scope and spirit of the claimed invention. Similarly, while system 100 may include PCI bus 120, those of ordinary skill will recognize that other types of communication or data buses may be used without departing from the scope and spirit of the claimed invention. While FIGS. 1 and 2 show antenna 102 mounted within floppy disk drive bay 104, the claimed invention is not limited in this respect and, hence, those of skill in the art will recognize that antenna 102 may be mounted elsewhere within case 106 such as, for example, within CD drive bay 122, DVD drive bay 122, or embedded within case 106, and still remain within the scope and spirit of the claimed invention.

Figure 3:
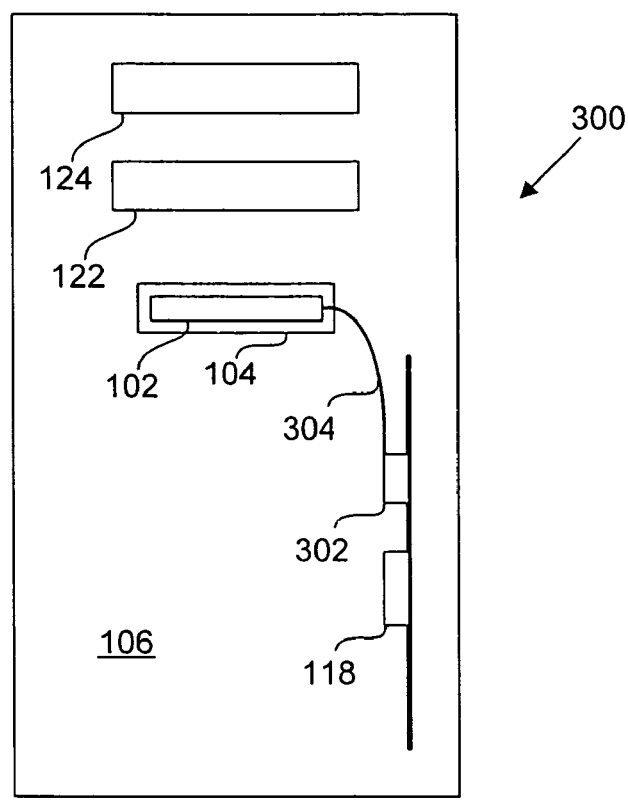
FIG. 3 illustrates an example system.
Figure 4:
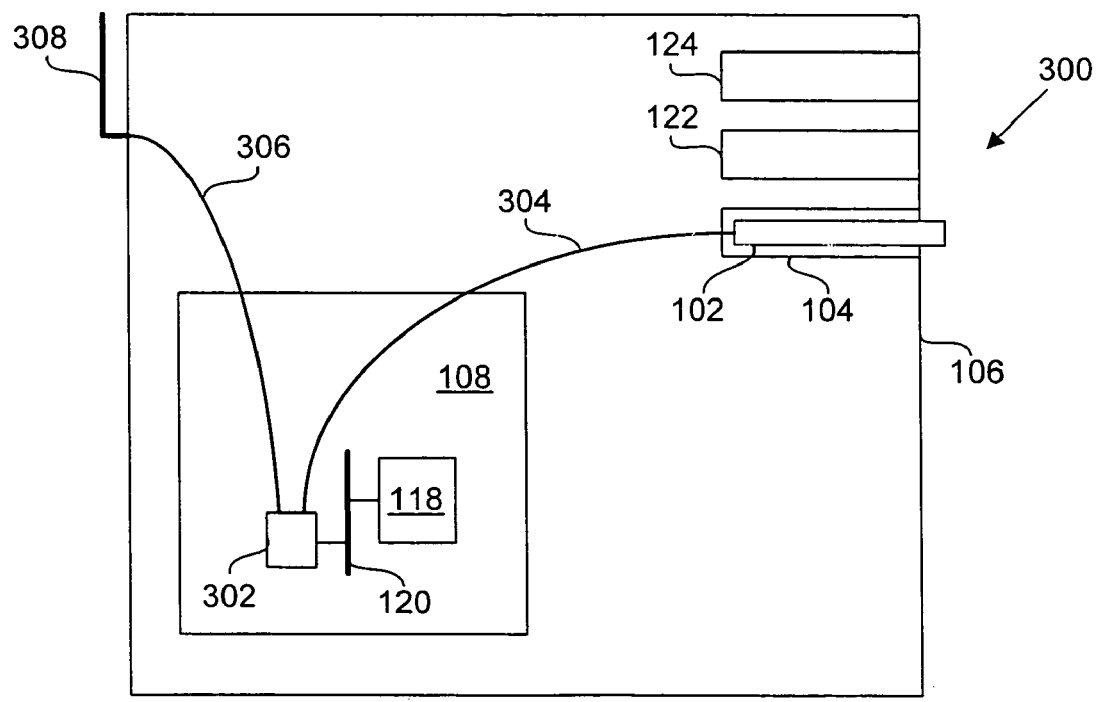
FIG. 4 is a side view of the system of FIG. 3.

FIG. 3 illustrates an example system 300. FIG. 4 is a side view of system 300. While system 300 illustrates an implementation of a general-purpose desktop computer system, the claimed invention is not limited in this regard. Although system 300 may be embodied in a single device, in some implementations certain components of system 300 may be remote or physically separated from other components of system 300. Further, although system 300 is illustrated as including discrete components, these components may be implemented in hardware, software/firmware, or some combination thereof. When implemented in hardware, some components of system 300 may be combined in a certain chip or device.

System 300 may include first wireless antenna 102, floppy disk drive bay 104, computer case 106, motherboard 108, LAN wireless communications circuitry 302, a first antenna lead 304, a third wireless antenna 308, a second antenna lead 306, processor 118, PCI bus 120, CD drive bay 122, and DVD drive bay 124. Antenna 102 may receive wireless information broadcast from a source remote to system 300 and may communicate that information to circuitry 302 through lead 304. Circuitry 302 may then supply that information to processor 118 over PCI bus 120. Similarly, antenna 308 may receive wireless information broadcast from a source remote to system 100 and may communicate that information to circuitry 302 through lead 306. Circuitry 302 may then supply that information to processor 118 over PCI bus 120.

Although system 300 may include wireless communication circuitry 302 suitable for linking to a LAN, in some implementations, wireless communications circuitry 302 may include circuitry suitable for connecting to a wide area network (WAN), or for connecting to a point-to-point wireless communications system, although the claimed invention is not limited in this regard. Furthermore, in some implementations, circuitry 302 may include interface circuitry to receive the information from antenna 102 and/or antenna 308. While circuitry 302 may include interface circuitry to receive the information from antenna 102 and/or antenna 308, the claimed invention is not limited in this respect and those of skill in the art will recognize that interface circuitry for linking or communicatively coupling to antenna 102 and/or antenna 308 may be physically separate from circuitry 302 and remain within the scope and spirit of the claimed invention.

Although system 300 may include PCI bus 120, those of ordinary skill will recognize that other types of communication or data buses may be used without departing from the scope and spirit of the invention. While FIGS. 3 and 4 show antenna 102 mounted within floppy disk drive bay 104, the claimed invention is not limited in this respect and, hence, those of skill in the art will recognize that antenna 102 may be mounted elsewhere within case 106 such as, for example, within CD drive bay 122, DVD drive bay 122, or embedded within case 106, and still remain within the scope and spirit of the claimed invention.

Figure 5:
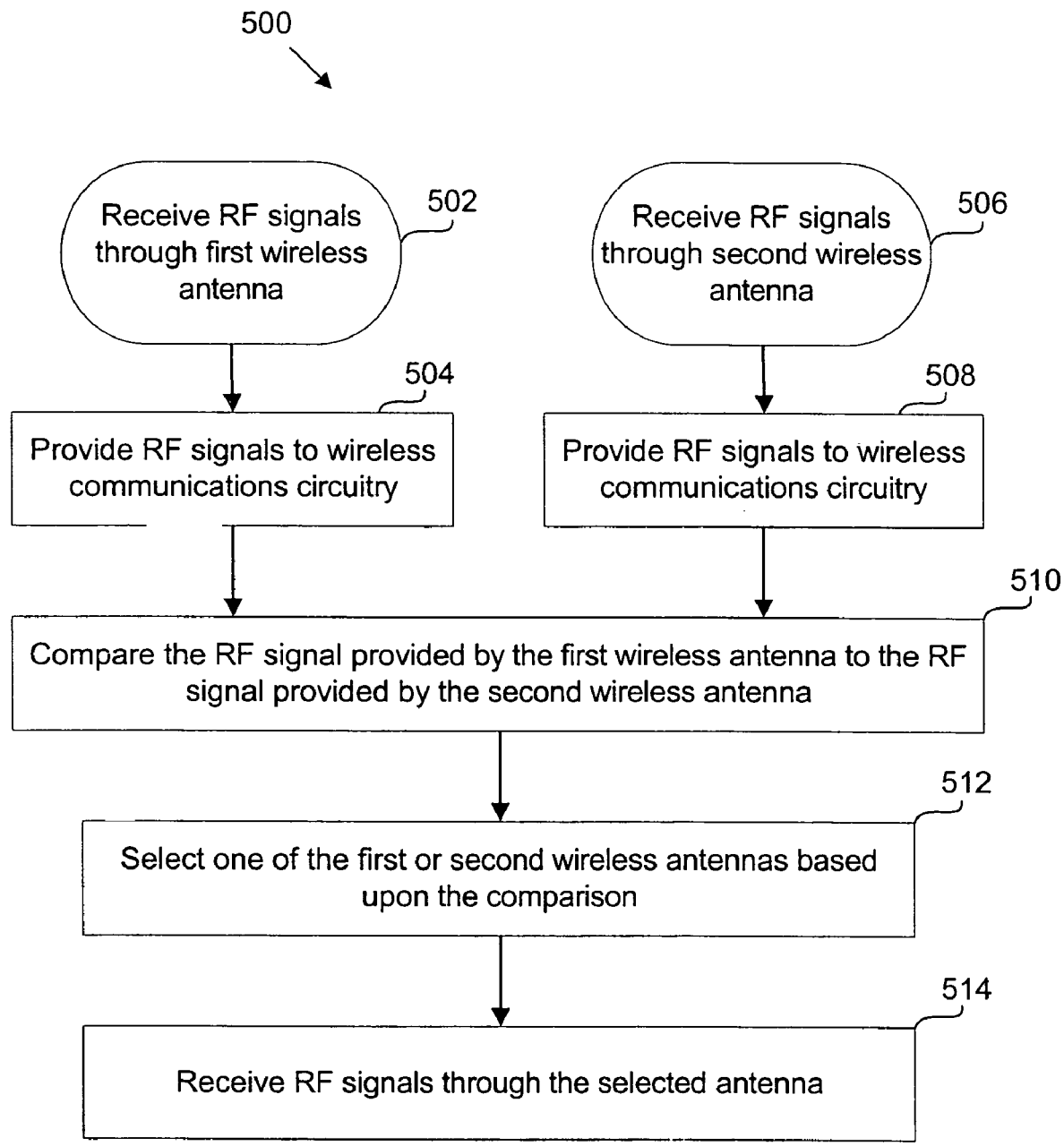
FIG. 5 is a flow diagram illustrating a process of implementing a diverse antenna solution employing a case mounted antenna.

FIG. 5 is a flow diagram illustrating a process 500 of operating a diverse wireless antenna solution employing a case mounted wireless antenna. Although process 500 may be described with regard to system 100 for ease of explanation, the claimed invention is not limited in this regard. Processing may begin with antenna 102 receiving radio frequency RF signals or communications from, for example, a remote LAN base station (not shown) [act 502]. While in this implementation antenna 102 receives RF signals from a remote LAN base station, those of skill in the art will recognize that antenna 102 can receive RF signals from any other source of LAN-based RF signals while remaining within the scope and spirit of the claimed invention. Moreover, while process 500 may be described with regard to LAN wireless communications, those of skill in the art will recognize that antenna 102 can receive RF signals from any other source of wireless network communications including WAN-based, or point-to-point wireless communications while remaining within the scope and spirit of the claimed invention.

Processing may continue with antenna 102 providing, through antenna lead 114, the RF signals to the wireless communications circuitry on NIC 110 [act 504]. While antenna 102 is receiving RF signals and communicating those signals to NIC 110, antenna 116 is also receiving RF signals [act 506] and communicating or providing those signals to NIC 110 [act 508].

After antennas 102 and 116 have provided RF signals to NIC 110, processing continues with circuitry in NIC 110 comparing the RF signals provided by antenna 102 with or to the RF signals provided by antenna 116 [act 510]. While the circuitry performing the signal comparison may comprise the wireless communications circuitry of NIC 110, NIC 110 may have additional circuitry such as signal processing circuitry and computational circuitry suitable for comparing the RF signals without departing from the scope or spirit of the claimed invention. Alternatively, the RF signals may be compared using circuitry located somewhere other than on NIC 110, such as, for example, circuitry in processor 118, without departing from the scope or spirit of the claimed invention.

The act of comparing the RF signals may, among many possible implementations, comprise comparing the signal strengths, or comparing the signal qualities, by, for example, comparing signal-to-noise ratios, although the claimed invention is not limited in this respect Processing continues with the selecting of one of either the first or the second antenna [act 512] based upon the comparison undertaken in act 510. While the circuitry performing the selection of act 512 may comprise the wireless communications circuitry of NIC 110, NIC 110 may have additional circuitry such as signal processing circuitry combined with computational circuitry suitable for performing the selection without departing from the scope or spirit of the claimed invention. Alternatively, the selection of act 512 may be performed by circuitry located somewhere other than on NIC 110, such as, for example, circuitry in processor 118, without departing from the scope or spirit of the claimed invention. Processing continues at act 514 with further RF signal reception undertaken using the antenna selected at act 512.

Figure 6:
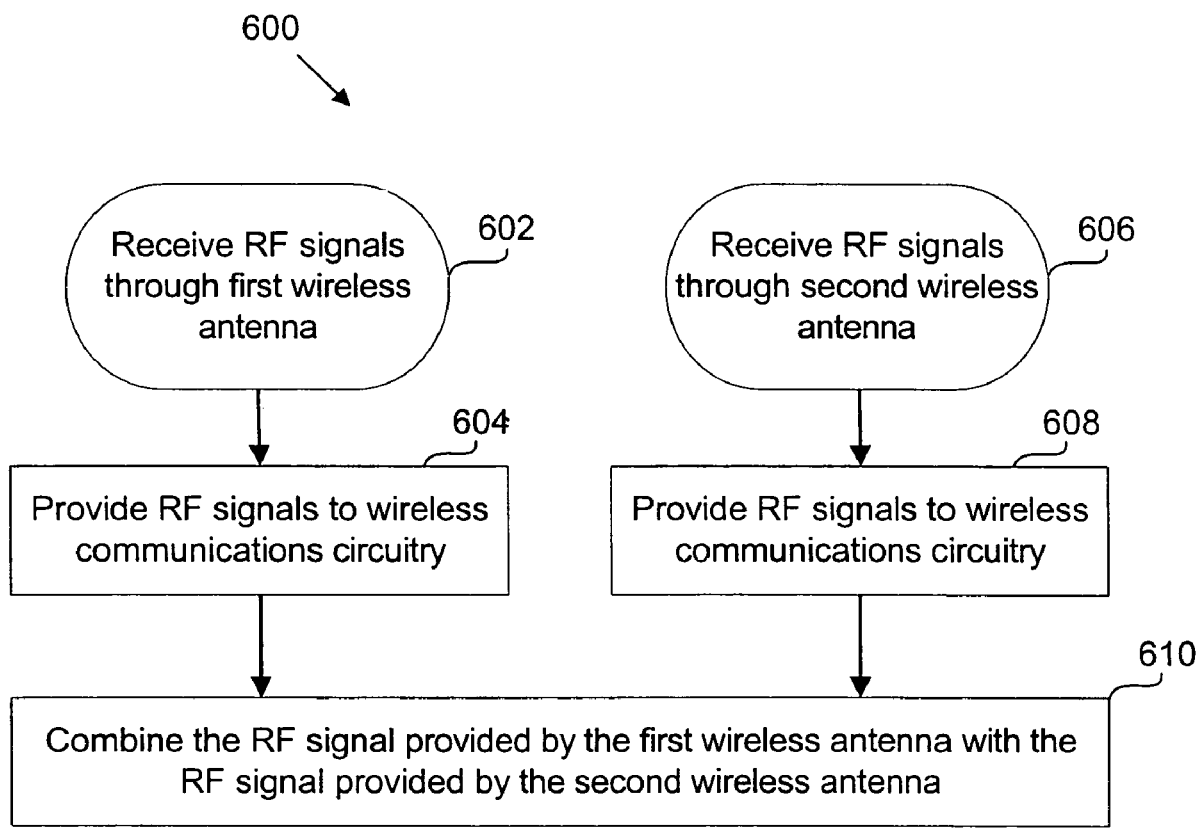
FIG. 6 is a flow diagram illustrating a process of implementing a diverse antenna solution employing a case mounted antenna.

FIG. 6 is a flow diagram illustrating a process 600 of operating a diverse wireless antenna solution employing a case mounted wireless antenna. Although process 600 may be described with regard to system 300 for ease of explanation, the claimed invention is not limited in this regard. Processing may begin with antenna 102 receiving radio frequency RF signals or communications from, for example, a remote LAN base station (not shown) [act 602]. While in this implementation antenna 102 receives RF signals from a remote LAN base station, those of skill in the art will recognize that antenna 102 can receive RF signals from any other source of LAN-based RF signals while remaining within the scope and spirit of the claimed invention. Moreover, while process 600 may be described with regard to LAN wireless communications, those of skill in the art will recognize that antenna 102 can receive RF signals from any other source of wireless network communications including WAN-based, or point-to-point wireless communications while remaining within the scope and spirit of the claimed invention.

Processing may continue with antenna 102 providing, through antenna lead 304, the RF signals to the wireless communications circuitry 302 on motherboard 108 [act 604]. While antenna 102 is receiving RF signals and communicating those signals to circuitry 302, antenna 308 is also receiving RF signals [act 606] and communicating or providing those signals to circuitry 302 [act 608].

After antennas 102 and 308 have communicated RF signals to circuitry 302, processing continues with circuitry 302 combining the RF signals provided by antenna 102 with the RF signals provided by antenna 308 [act 610]. While the circuitry performing the combining act may comprise circuitry 302, motherboard 108 may have additional circuitry such as signal processing circuitry and computational circuitry suitable for combining the RF signals without departing from the scope or spirit of the claimed invention. Alternatively, the RF signals may be combined using, for example, circuitry in processor 118, without departing from the scope or spirit of the claimed invention.

The act of combining the RF signals may, among many possibilities, comprise adding the RF signals together to form an additive sum, or taking the difference between the RF signals to form a differential signal, although the claimed invention is not limited in this respect.

The acts in FIGS. 5 and 6 need not be implemented in the order shown; nor do all of the acts necessarily need to be performed. In addition, one or more of the acts in FIGS. 5 and 6 may be repeated on an on-going basis, such as, for example, at regular intervals during the operation of system 100 or system 300. Also, those acts that are not dependent on other acts may be performed in parallel with the other acts. Further, at least some of the acts in this figure may be implemented as instructions, or groups of instructions, implemented in a machine-readable medium.

Moreover, the acts in FIGS. 5 and 6 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention.

For example, the diverse antenna solution described herein is not limited to antennas mounted in peripheral drive bays. Rather, it may include antennas embedded within the physical structure of a desktop computer case. Also, although described in terms of a two antenna solution, in some implementations a diverse antenna solution may employ more three or more antennas where those antennas are spatially distributed about the computer case. For example, a first antenna may be mounted on a NIC, a second antenna may be mounted in a floppy drive bay, while a third antenna may be embedded in the computer case. Clearly, many other possible combinations of antennas may be employed to provide a diverse antenna solution.

No element, act, or instruction used in the description of the present application should be construed as critical or essential to the invention unless explicitly described as such. Also, as used herein, the article "a" is intended to include one or more items. Where only one item is intended, the term "one" or similar language is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A system comprising:
a desktop computer case;
a peripheral drive bay adjacent to the case;
wireless communications circuitry located within the case;
a first antenna mounted, at least partially, in the peripheral drive bay and communicatively coupled to the wireless communication circuitry; and
a second antenna mounted on or adjacent to a rear portion of the case such that the second antenna is at least partially external to the case and communicatively coupled to the wireless communication circuitry within the case.

2. The system of claim 1, further comprising:
an antenna lead, wherein the antenna is communicatively coupled to the wireless communication circuitry by the antenna lead.

3. The system of claim 2, further comprising:
a Peripheral Component Interconnect (PCI) bus;
a PCI socket coupled to the PCI bus; and
a network interface card (NIC) coupled to the PCI socket, wherein the NIC includes the wireless communication circuitry.

4. The system of claim 3, wherein the wireless communication circuitry is communicatively coupled to the PCI bus through the PCI socket.

5. The system of claim 3, wherein the NIC comprises a wireless local area network (LAN) card mounted in the PCI socket.

6. The system of claim 1, wherein the wireless communication circuitry is mounted on a computer motherboard located within the case.

7. An apparatus, comprising:
a desktop computer case having a peripheral drive bay adjacent to the case; and
a first antenna mounted on or adjacent to a rear portion of the case such that the first antenna is at least partially external to the case and spatially separated from a second antenna mounted, at least partially, in the peripheral drive bay.

8. The apparatus of claim 7, further comprising:
wireless communication circuitry located within the computer case and communicatively coupled to the first and second antennas.

9. The apparatus of claim 8, further comprising:
at least one antenna lead communicatively coupling at least one of the first or second antennas to the wireless communication circuitry.

10. A wireless network interface, comprising:
wireless communication circuitry;
a first antenna coupled to the wireless communication circuitry and mounted on or adjacent to a rear portion of a desktop computer case such that the first antenna is at least partially external to the case;
a second antenna coupled to the wireless communication circuitry and mounted at least partially in a peripheral drive bay of the desktop computer case and spatially separated from the first antenna; and
interface circuitry for coupling the second antenna to the wireless communication circuitry.

11. The wireless network interface of claim 10, further comprising:
an antenna lead for communicatively coupling the second antenna to the interface circuitry.

12. The wireless network interface of claim 11, further comprising:
the second antenna communicatively coupled to the interface circuitry by the antenna lead.

13. A method comprising:
receiving signals through a first antenna mounted on or adjacent to a rear portion of a desktop computer case such that the first antenna is at least partially external to the case;

receiving signals through a second antenna mounted at least partially in a peripheral drive bay of the case and spatially separated from the first antenna; and providing the signals received through the first antenna and the signals received through the second antenna to wireless communication circuitry located within the computer case.

14. The method of claim 13, further comprising:

comparing the signals received through the first antenna with the signals received through the second antenna.

15. The method of claim 14 wherein comparing the signals comprises at least comparing the strength of the signals received through the first antenna with the strength of the signals received through the second antenna.

16. The method of claim 14 wherein comparing the signals comprises at least comparing the quality of the signals received through the first antenna with the quality of the signals received through the second antenna.

17. The method of claim 16 wherein comparing the quality of the signals comprises comparing at least the signal-to-noise ratio of the signals received through the first antenna with the signal-to-noise ratio of the signals received through the second antenna.

18. The method of claim 14, further comprising:

selecting one of the first antenna or second antenna based on comparing the signals received through the first antenna with the signals received through the second antenna.

19. The method of claim 18, further comprising:

receiving signals through the selected antenna.

20. The method of claim 13, further comprising:

combining the signals received through the first antenna with the signals received through the second antenna.

21. The method of claim 20 wherein combining the signals comprises at least adding the signals received through the first antenna to the signals received through the second antenna.

22. The method of claim 20 wherein combining the signals comprises at least taking the difference between the signals received through the first antenna and the signals received through the second antenna.

23. A machine-accessible medium including instructions that, when executed, cause a machine to:

receive signals through a first antenna mounted on or adjacent to a rear portion of a desktop computer case such that the first antenna is at least partially external to the case;

receive signals through a second antenna mounted at least partially in a peripheral drive bay of the case and spatially separated from the first antenna; and provide the signals received through the first antenna and the signals received through the second antenna to wireless communication circuitry located within the computer case.

24. The machine-accessible medium of claim 23, further including instructions that, when executed, cause a machine to:

compare the signals received through the first antenna with the signals received through the second antenna.

25. The machine-accessible medium of claim 23, further including instructions that, when executed, cause a machine to:

combine the signals received through the first antenna with the signals received through the second antenna.

* * * * *